(No Model.)
L. A. BUDLONG.
HAND CULTIVATOR.
No. 272,854. Patented Feb. 27, 1883.
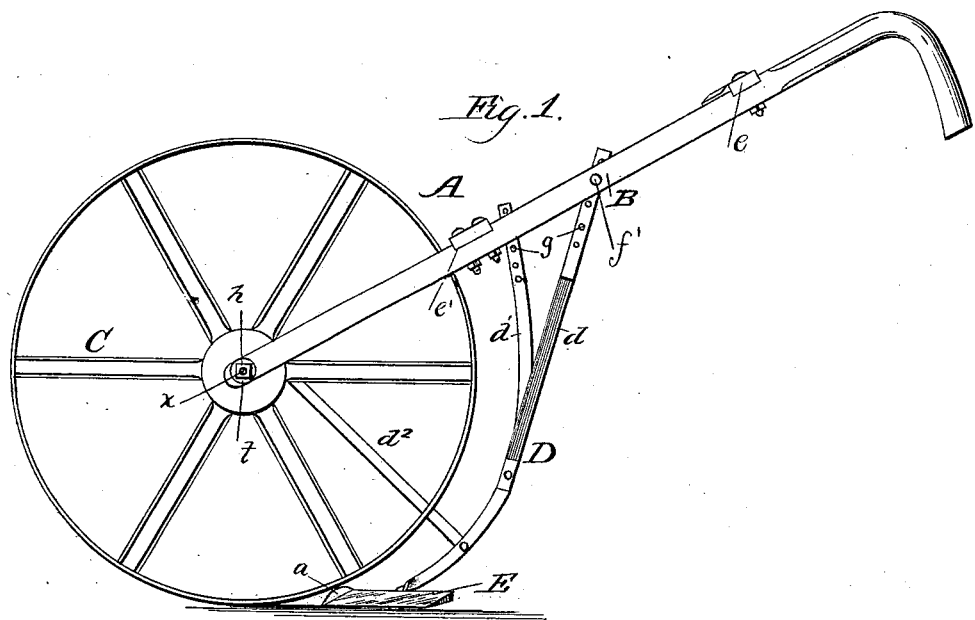
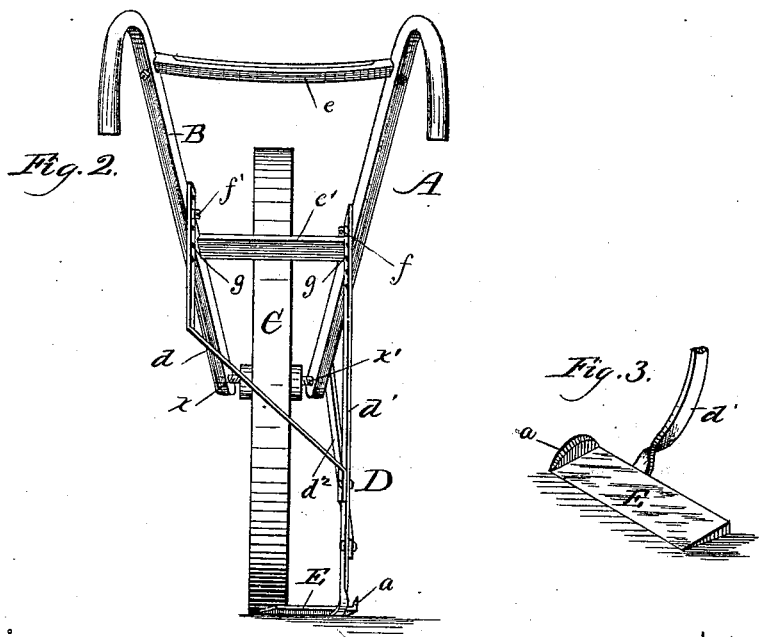
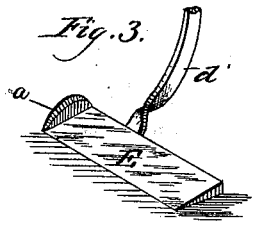
Witnesses
F. B. Townsend
Chas. E. Gaylord.
Inventor
Lyman A Budlong
By A. M. Stout atty

UNITED STATES PATENT OFFICE.

LYMAN A. BUDLONG, OF CHICAGO, ILLINOIS.

HAND-CULTIVATOR.

SPECIFICATION forming part of Letters Patent No. 272,854, dated February 27, 1883.

Application filed June 3, 1882. (No model.)

*To all whom it may concern:*

Be it known that I, LYMAN A. BUDLONG, of the city of Chicago, county of Cook, and State of Illinois, have invented certain Improvements in Hand-Cultivators, of which the following is a specification.

My invention relates to certain improvements in hand-cultivators, hereinafter fully described with reference to the accompanying drawings, in which—

Figure 1 represents a side elevation of a machine embracing in its construction my said improvements; Fig. 2, an elevation of the same, presenting a rear view; and Fig. 3, a detail view, in perspective, of the cutter or blade E, and the lower portion or shank of rod $d'$, upon which it is mounted and fastened.

B indicates the two wooden handles, and $e$ and $e'$ two cross-bars fastened across them, and constituting the main frame; and $x$ the axle upon which the carrying-wheel C is mounted, and which is confined in its position on the axle by right and left handed screw-nuts, as shown; and the lower ends of the handles B are confined on the outer ends of the axle by a head on one end of it and a nut with a washer, $t$, on the other.

D indicates a frame, preferably made of iron, and is composed of the three bars $d$, $d'$, and $d^2$, all of which are attached to the wooden frame at their upper ends by headed bolts and nuts; and to the bar $d'$, bent into the curved form shown in Fig. 1, the cutter or blade E is rigidly attached, so that it stands nearly parallel with the surface of the ground, just behind and partially under the wheel C, but not in contact with the same, with its cutting-edge at an angle of about forty-five degrees with the line of travel of the wheel. One end of the blade E is also provided with a cutting-edge, $a$, which is turned up into a vertical position.

This improved implement of mine is designed to be grasped by the handles by the operator and pushed before him, and is especially adapted to the cultivation of onions and other plants in rows which are near together. The blade is adapted to shave the crust from the soil between the rows of plants, and cut off or pull up by the roots young weeds, and the vertical cutting-edge $a$ may pass very near the plants and split the crust, if any there be, upon the surface and shield the plants from clods, weeds, and dirt that might otherwise be thrown upon them by the blade; and it serves still another purpose, for it indicates to the eye of the operator at all times the exact position in reference to the plants. But for its guidance, he might run the blade into the row of plants and cut them off under the surface. The blade is set with its cutting-edge at the angle before specified, with the line of travel, in order that it may shed off and clear itself of the weeds and soil, and the shank of the rod $d'$ is curved downward near the blade, in order that weeds and trash may not find lodgment in the angle between the two parts.

In order that the elevation of the handles may be adjusted to the height of the operator, the two bars $d$ and $d'$ are provided with a series of holes, $g$, so that the bars may be fastened to the handles B at different elevations by means of the bolts $f$ and $f'$ passing through them. The blade E stands in the rear of the wheel, and near to the portion of it that presses the surface for the time being, in order that it may move up or down with the wheel where there may be elevations and depressions in the surface.

What I claim as my invention, and desire to secure by Letters Patent, is—

In combination with the pioneer wheel C, the blade E, mounted and fastened upon its frame D, with its cutting-edge at an acute angle with its line of motion, and provided with vertical guide-cutter $a$, substantially as and for the purpose described.

LYMAN A. BUDLONG.

Witnesses:
C. E. ROE,
A. RUSSELL.